United States Patent [19]

Rowe et al.

[11] Patent Number: 4,977,734

[45] Date of Patent: Dec. 18, 1990

[54] FOLDABLE HAY RAKE

[76] Inventors: Carroll G. Rowe, Rte. 3, P.O. Box 122 A1, Hope, Ark. 71801; John D. Little, Rte. 1, P.O. Box 165, Fulton, Ark. 71838

[21] Appl. No.: 433,807

[22] Filed: Nov. 9, 1989

Related U.S. Application Data

[63] Continuation-in-part of Ser. No. 388,434, Aug. 2, 1989, abandoned.

[51] Int. Cl.⁵ ............................................. A01D 78/14
[52] U.S. Cl. ...................................... 56/15.9; 56/377; 56/384; 56/DIG. 21
[58] Field of Search ....................... 56/377, 14.9, 15.9, 56/16.1, 16.3, 367, 350, 378, 379, 341, 384, DIG. 10, DIG. 14, DIG. 21

[56] References Cited

U.S. PATENT DOCUMENTS

| | | |
|---|---|---|
| 3,484,803 | 1/1968 | Breed et al. . |
| 3,834,142 | 9/1974 | Johnston et al. . |
| 3,936,994 | 2/1976 | Mortier et al. . |
| 3,995,416 | 12/1976 | van der Lely . |
| 4,034,623 | 7/1977 | Boone et al. . |
| 4,043,099 | 8/1977 | Cheatum . |
| 4,058,958 | 11/1977 | Sadler et al. . |
| 4,077,189 | 3/1978 | Hering . |
| 4,214,428 | 7/1980 | Caraway . |
| 4,457,127 | 7/1984 | Maier et al. . |
| 4,555,897 | 12/1985 | Degelman . |
| 4,621,487 | 11/1986 | Urlacher et al. . |
| 4,622,806 | 11/1986 | Bahman et al. . |
| 4,682,462 | 7/1987 | Johnson, Sr. . |
| 4,685,282 | 8/1987 | Allen . |
| 4,723,401 | 2/1988 | Webster et al. . |
| 4,723,402 | 2/1988 | Webster et al. . |
| 4,753,063 | 6/1988 | Buck ................................... 56/370 |

Primary Examiner—Ramon S. Britts
Assistant Examiner—Terry Lee Melius
Attorney, Agent, or Firm—Fulbright & Jaworski

[57] ABSTRACT

A hay rake moveable between a rake position and a transport position. A frame assembly supported by an axle and wheels carries two sets of fingerwheel hay rakes which are rotatable on an axis positioned transversely to the axle. A hitch assembly which is connected to a towing vehicle is pivotedly connected to the frame. A connecting linkage is provided between the hitch assembly and the frame and a power source is connected to the frame for rotating the wheel rakes about their axis and rotating the frame relative to the hitch assembly thereby rotating the rakes between a downward and outward rake position and an upward and inward transport position.

12 Claims, 5 Drawing Sheets

4,977,734

FOLDABLE HAY RAKE

CROSS-REFERENCE TO RELATED APPLICATIONS

This application is a continuation in part of U.S. patent application Ser. No. 07/388,434, filed Aug. 2, 1989, entitled Foldable Hay Rake, now abandoned.

BACKGROUND OF THE INVENTION

It is known as disclosed in U.S. Pat. Nos. 4,214,428; 3,484,803; and 3,995,416 to fold hay rakes from a downwardly operational hay raking position to an upward transport position for moving the hay rake to a different location.

The present invention is directed to an improved foldable hay rake in which the fingerwheel hay rakes are supported and operated in such a manner that the rakes may be easily moved by the operator from a hay raking position to a convenient transport position. The advantage of this invention is that the operator does not have to get off of the tractor in changing from a working to a transport position. Also, when the rake wheels are positioned in the transport position, the rake wheels are in a compact horizontal configuration requiring minimal width. The present invention also improves the efficiency of the hay rake as it enables it to make windrows around curves, follows the contour of the ground better, and all but eliminates the side thrust against the rake wheels and sharp turns without raising the rake.

SUMMARY

The present invention is generally directed to a foldable hay rake which is movable between a rake position and a transport position and includes a frame assembly supported by an axle and wheels for being moved by a vehicle. A plurality of fingerwheel rakes are rotatably carried by the frame on an axis which is positioned transversely to the axle. A hitch assembly is pivotally connected to the frame and includes means for connection to the vehicle and a connecting link is connected between the hitch assembly and the frame. A power means is provided for rotating the wheel rakes about their axis and rotating the frame relative to the hitch assembly thereby rotating the rakes between a downward and outward rake position and an upward and inward transport position.

Still a further object of the present invention is wherein the combination of the connecting linkage between the hitch assembly and the frame and the actuation of the power means rotates the rakes about their axis between an inward and outward position and rotates the rakes vertically by a rotational movement of the frame assembly relative to the hitch assembly.

Another object is wherein the power means are connected between the hitch assembly and the frame for rotating the frame about the axle and relative to the hitch assembly. A rotating mechanism is connected between the hitch assembly and rotatable pedestals for rotating the rakes as the frame is moved relative to the hitch assembly thereby moving the rakes between a rake position and a transport position.

Yet a further object of the present invention is a provision of a hay rake having a frame assembly supported by an axle and wheels. Left and right fingerwheel rakes are attached by a pedestal to first and second rake carrier brackets which include an axis of rotation aligned transversely to the axle. A pedestal rotatably supports the rakes from the axis of the rake carriers. A vehicle hitch assembly is pivotedly connected to the frame and includes means for connection to a towing vehicle. A lever arm is connected to each of the rotatable pedestals, and a connecting link is connected between the hitch assembly and each of the lever arms. Actuation of the power means causes rotation between the frame and the hitch assembly which in turn causes the lever arms to rotate the pedestals and the rakes between the rake position and transport position.

Yet a further object of the present invention is wherein the power means is a hydraulic piston and cylinder assembly controlled from the towing vehicle.

Yet a further object of the present invention is wherein the hitch assembly includes a side brace pivotedly connected to opposite sides of the frame assembly. The hitch assembly pivot connection to the frame is between and is in line with the pivot connections of the side braces to the frame assembly.

A further object of the present invention is wherein the connecting links include a ball and socket connection between the hitch assembly and the lever arms for accommodating movement of the frame assembly relative to the hitch assembly.

A further object is wherein each rake assembly includes a main arm supporting a plurality of fingerwheel hay rakes in which the main arm is at an angle to the support base when the rake is in the rake position.

Yet a still further object is wherein the hitch assembly includes a cross-bar positioned spaced from the pivot connection of the hitch assembly to the frame and the cross-bar extends parallel to the axle to adjacent each of the rake pedestals.

Other and further objects, features and advantages will be apparent from the following description of a present preferred embodiment of the invention, given for the purpose of disclosure, and taken in conjunction with the accompanying drawings.

DESCRIPTION OF THE PREFERRED EMBODIMENT

Figure 1:
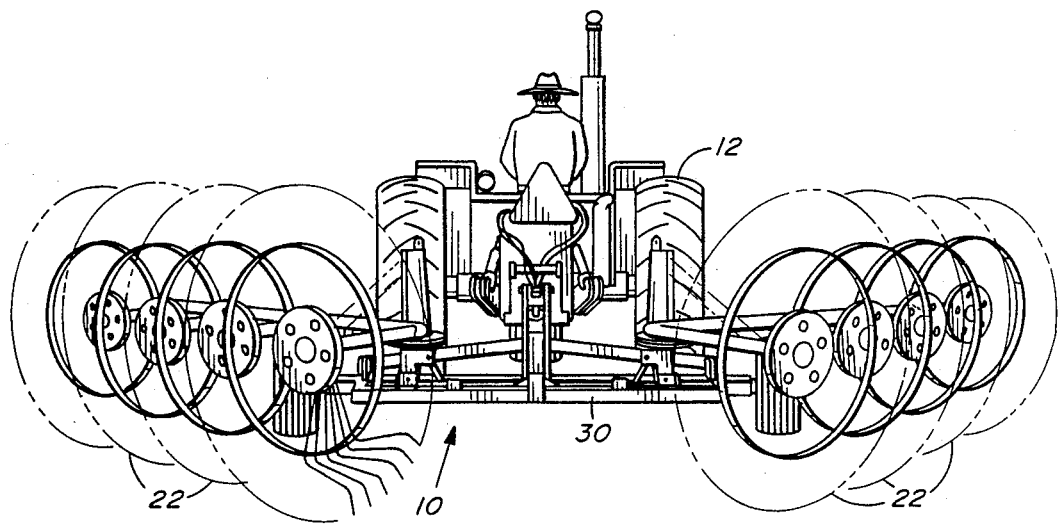
FIG. 1 is an elevational view of the hay rake of one embodiment of the present invention in the operating position for raking.
Figure 2:
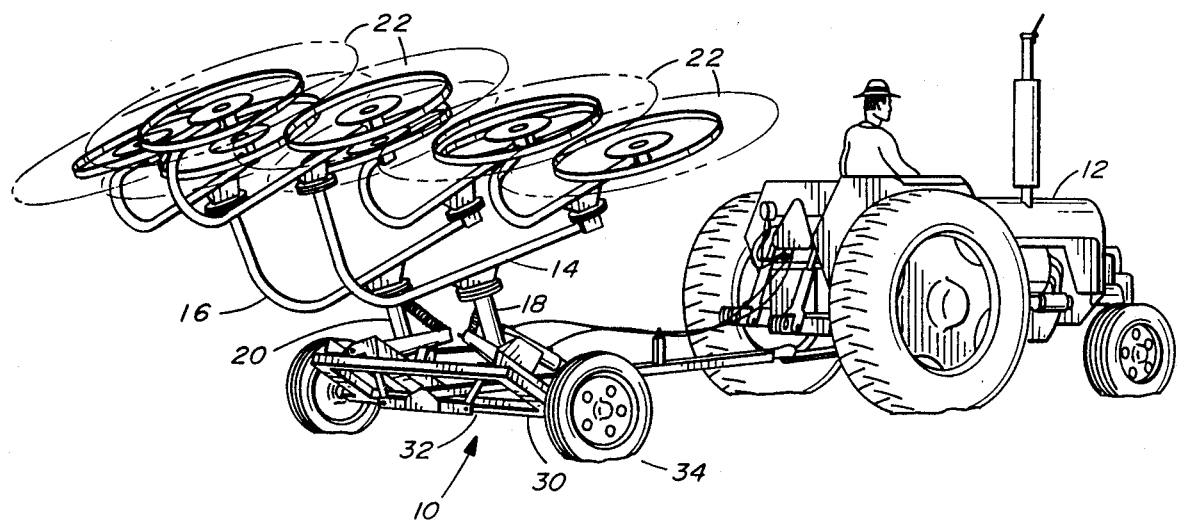
FIG. 2 is a perspective elevational view of the hay rake of FIG. 1 retracted into a transport position for being moved to other locations.

Referring now to the drawings, the reference numeral 10 generally indicates the retractable hay rake of the present invention best seen in FIGS. 1 and 2 as being towed by a conventional tractor 12. The hay rake 10 includes a plurality of wheel-type hay rakes here shown as the V-type fingerwheel hay rakes 14 and 16, each of which normally includes four or more rake wheels 22 and each set of which is supported from a main support arm 18 and 20, respectively. The rakes may be a conventional fingerwheel hay rake such as an eight wheel model sold by Settrex. Of course, other and different types of fingerwheel hay rakes may be utilized.

In FIG. 1, the arms 18 and 20 have been rotated downwardly, outwardly and backwardly to move the plurality of wheel rakes 22 to a downward and hay raking position. In FIG. 2, the main arms 18 and 20 have been pivoted upwardly, inwardly and forwardly to raise the wheel rakes 22 into a transport position, for example a nine foot transport width, for conveniently moving the hay rake 10 to a desired location. In FIG. 2, the sets 14 and 16 of wheel frames are rotated inwardly until they are substantially parallel and in a generally vertical position, thus permitting the alignment of the rake wheels 22 in a flat, generally horizontally overlapping position, thus minimizing the retracted width minimizing the height at the front, while providing ground clearance at the rear of the rake 10.

Figure 3:
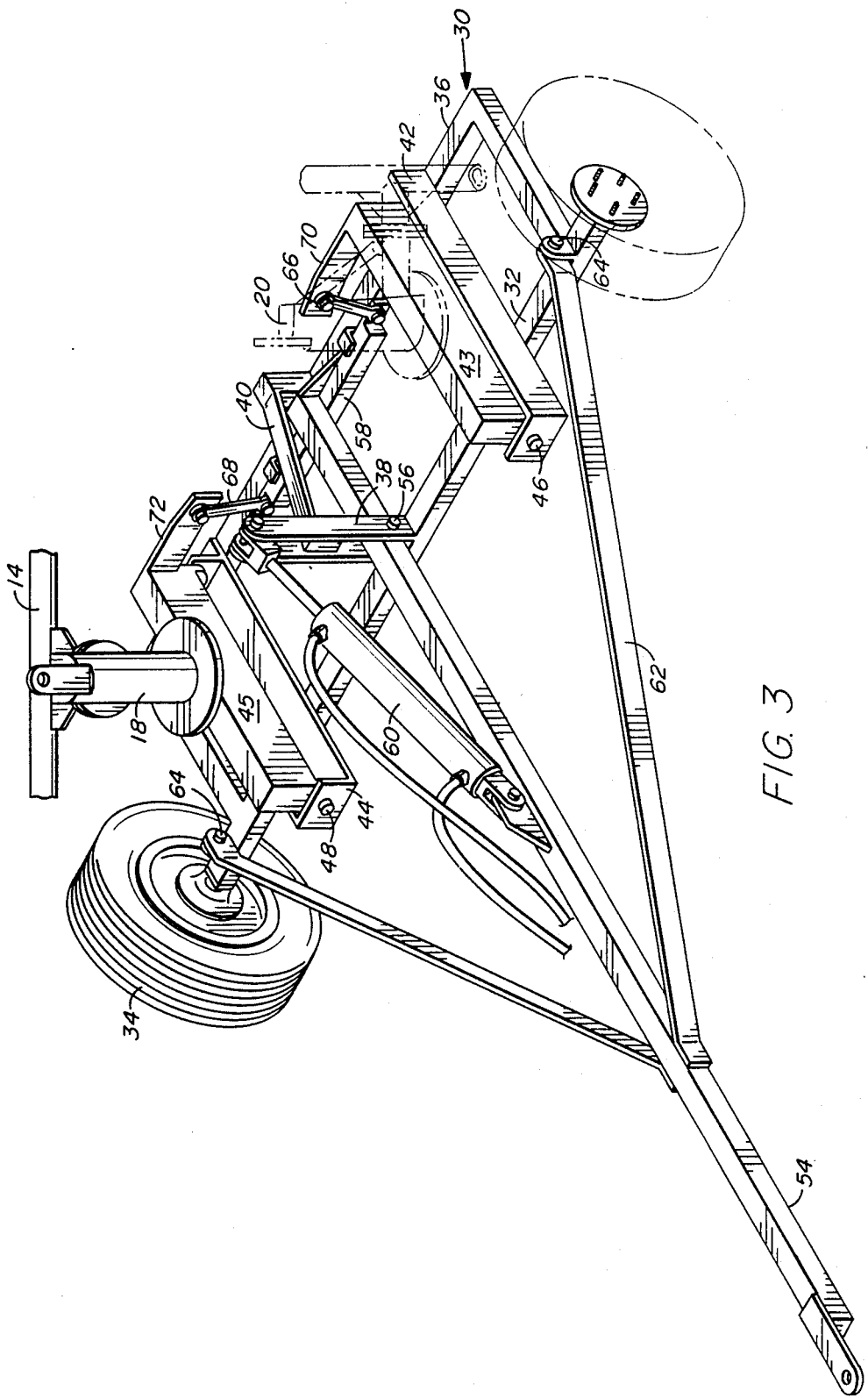
FIG. 3 is an enlarged fragmentary perspective view showing the operating mechanism of FIGS. 1 and 2 in the hay raking position.
Figure 4:
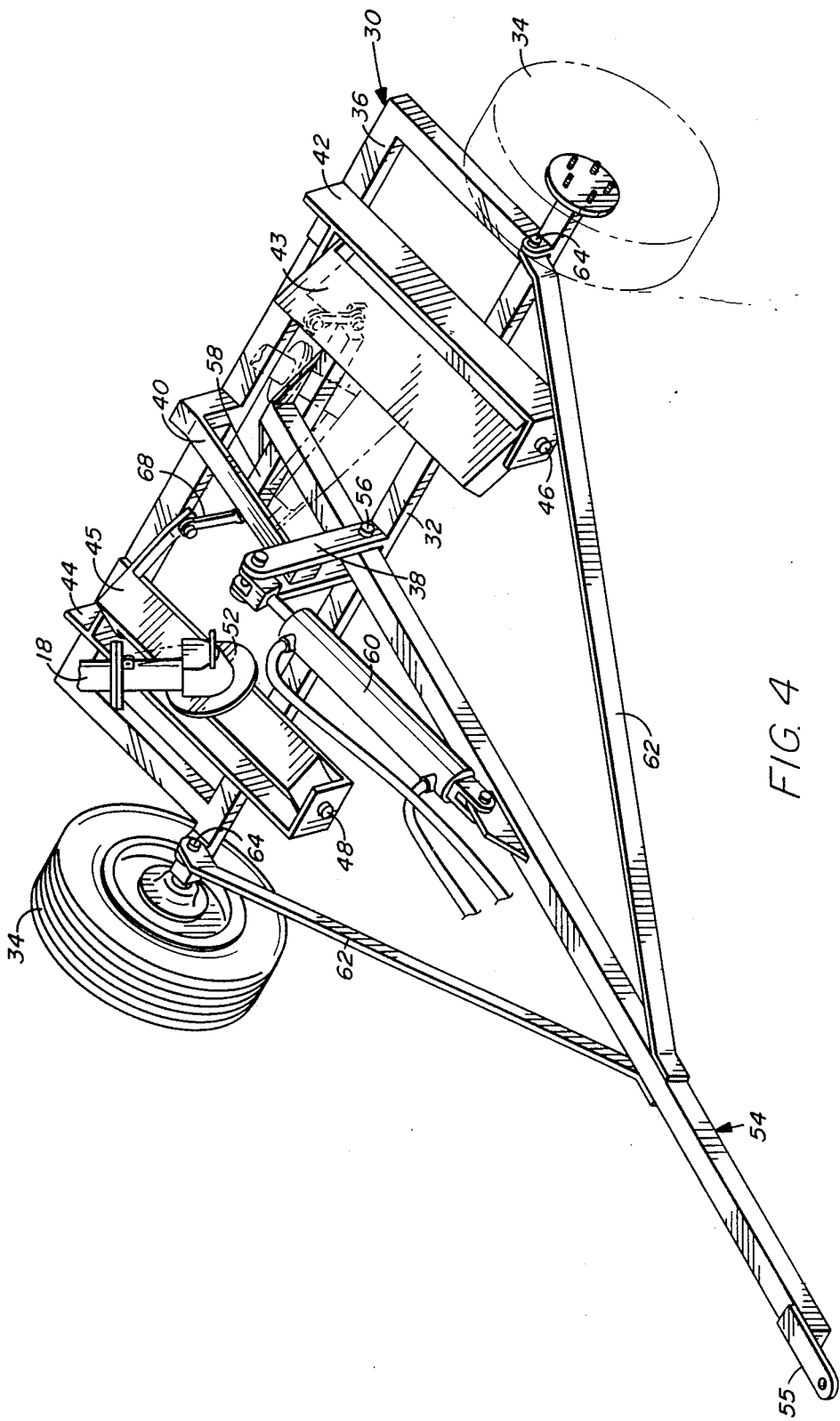
FIG. 4 is a view similar to FIG. 3 showing the mechanism in the transport position.

Referring to FIGS. 3 and 4, the hay rake 10 includes a frame assembly generally indicated by the reference numeral 30 which includes an axle 32, wheels 34 and a rear bracket 36 which is rigidly connected to the axle 32, and an upright pivoting arm 38 which is rigidly connected to the axle 32. A support arm 40 may be provided between the arm 38 and rear bracket 36 for support.

Left and right rake carrier brackets 42 and 44 are carried by the frame 30, such as between the axle 32 and bracket 36. Brackets 42 and 44 each include a rotatable pivot point on an axis 46 and 48, respectively. The brackets 42 and 44 and the axis 46 and 48 are positioned transversely to the axle 32. The carrier brackets 42 and 44 and pivot points on axis 46 and 48 are constructed to receive the lower two points of a standard category 1 three point pedestal 43 and 45, respectively. The pedestals 43 and 45, therefore, are rotatable about axis 46 and 48, respectively. For other styles of rakes which use a different type of mount, a special pedestal is fabricated to mount on the brackets 42 and 44.

A hitch assembly generally indicated by the reference numeral 54 is provided having a suitable connection 55 for attachment to a towing vehicle such as the tractor 12. The vehicle hitch assembly 54 is pivotedly mounted at point 56 to the main frame 30 and preferably includes a cross-bar 58 mounted at the rearward end of the hitch assembly 54.

A power means, preferably a hydraulic piston and cylinder assembly 60, is pivotedly connected between the vehicle hitch assembly 54 and the arm 38 of the frame assembly 30. Preferably the power means 60 is controlled and actuated from the towing vehicle 12. The vehicle hitch assembly 54 may also include side braces 62 which are pivotedly connected to the frame 30 at points 64. It is to be noted that the pivot point 56 between the hitch assembly 54 and frame 30 is preferably located mid-way between and in line with the pivot points 64. Actuation of the power means 60 causes the frame 30 to rotate around the axle 32 and relative to the vehicle hitch assembly 54 and particularly the cross-bar 58. That is, while the vehicle hitch assembly 54 remains stationary, the frame 30 rotates about the pivot points 56 and 64 in response to movement of power means 60.

A rotating mechanism is connected between the hitch assembly 54 and the pedestals 43 and 45 which rotate about axis 46 and 48, respectively, as the frame 30 is moved relative to the hitch assembly 54. The rotating assembly may include connecting links 66 and 68, respectively, which are connected between the cross-bar 58 and L-shaped lever arms 70 and 72, respectively, which are in turn connected to the pedestals 43 and 45, respectively. Preferably, the connecting links 66 and 68 include a ball socket at each end to allow forward and back movement as the main frame 30 pivots in an arc in relation to the hitch assembly 54. Therefore, rotation of the frame 30 relative to the hitch assembly 54 and particular to the cross-bar 58 causes rotation of the pedestals 43 and 45 about axis 46 and 48, respectively, and in turn rotation of the main arms 18 and 20 to move the rake wheels 22 from the hay raking position of FIGS. 1 and 4 to the transport position of FIGS. 2 and 3. It is to be noted that the main arms 18 and 20, carrying the rake sets 14 and 16, are mounted on the pedestals 43 and 45, respectively, which in turn are rotatably mounted on axis 46 and 48, respectively, which are parallel to each other. The main arms 18 and 20 are rotated to a position parallel to the ground plane when they are in the rake position (FIGS. 1 and 3). The main arms 18 and 20 are at an adjustable angle to the axis 48 and 46. When the arms 18 and 20 are rotated (by an angle somewhat less than 90°), upwardly, the arm sets 14 and 16 are in planes generally parallel to each other and the wheels 22 are on the same angle to the axis of rotation and generally horizontally aligned.

Thus, the present feature allows the rake assembly 10 to be rotated by the operator on the tractor 12 from the operating position of raking hay to a folded transport position. The rake wheels 22 may thus be rotated inwardly on parallel axis until the wheels 22 are generally in a vertical position permitting the alignment of the wheels 22 in a flat upright horizontally overlapping position which minimizes the width of the assembly 10 in the transport position, minimizes the heighth at the front while providing clearance at the rear of the rake to clear the ground.

Figure 5:
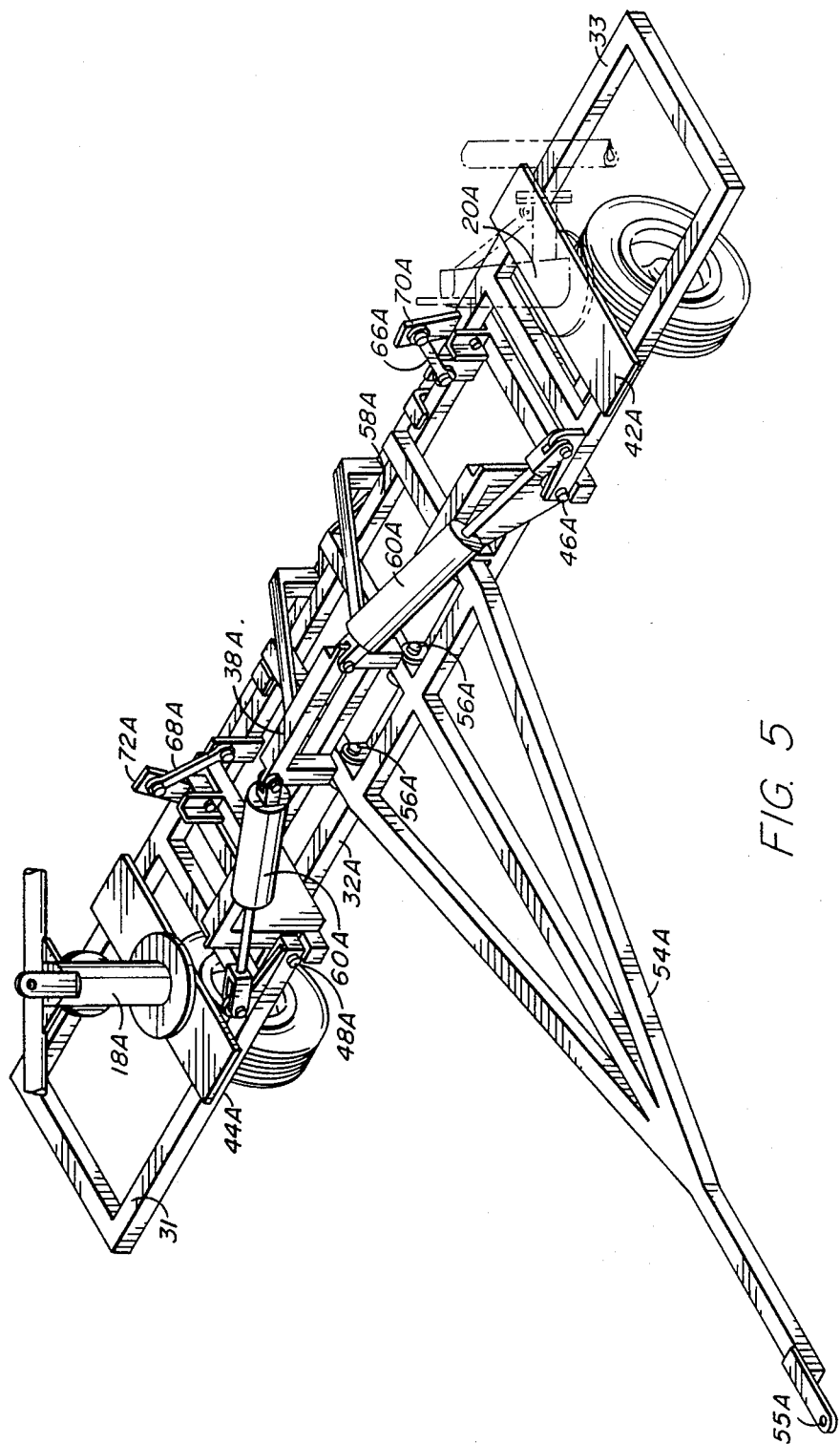
FIG. 5 is an enlarged fragmentary perspective view of another embodiment of the present invention shown in the hay raking position.
Figure 6:
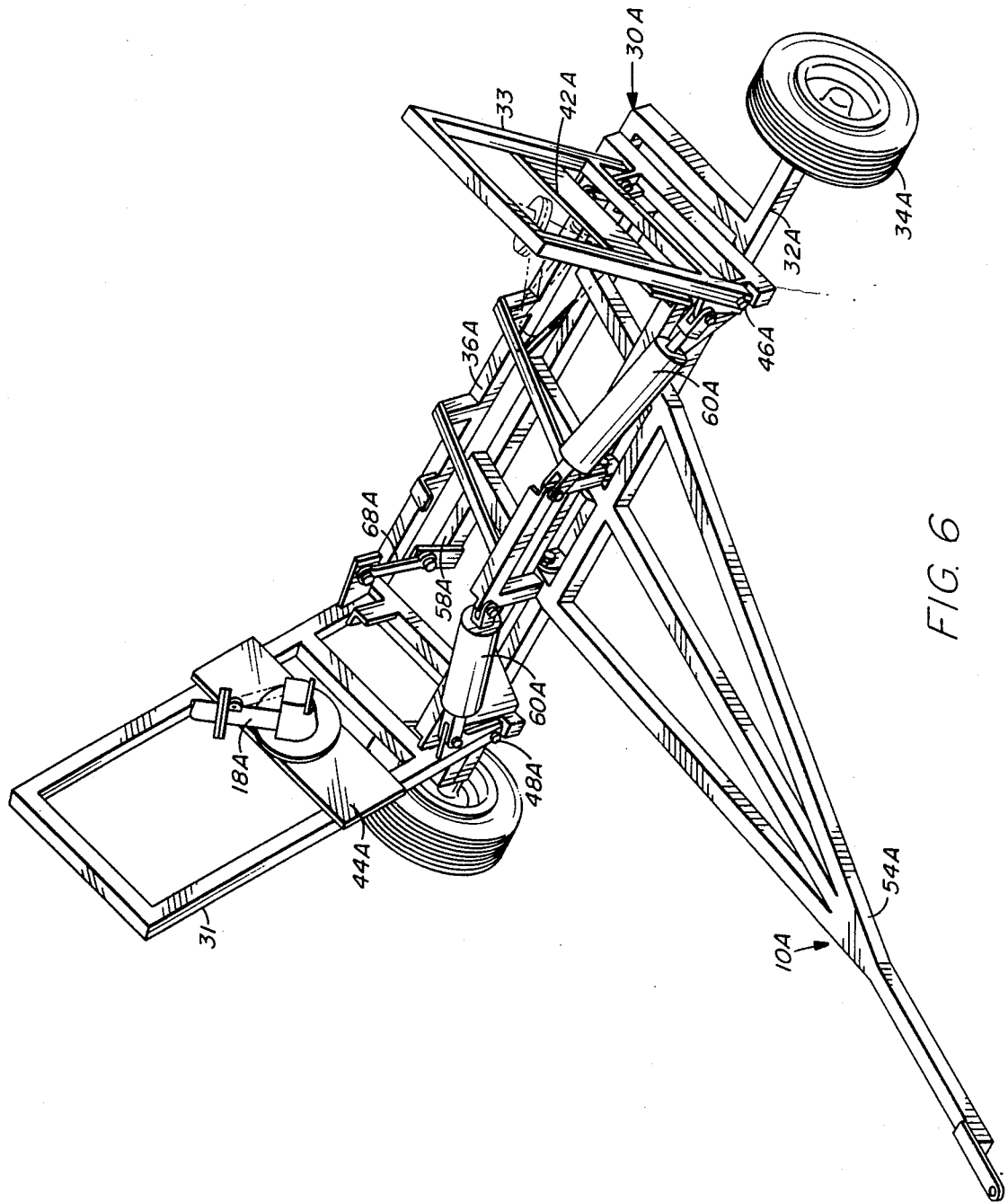
FIG. 6 is a view similar to FIG. 5 showing the hay rake in the transport position.

Referring now to FIGS. 5 and 6, another embodiment of the present invention is best seen in which like parts to those shown in FIGS. 1-4 are similarly numbered, with the addition of the suffix "a". This particular embodiment is a heavier duty hay rake for handling a greater number of finger rakes.

The hay rake 10a includes a frame assembly generally indicated by the reference numeral 30a which includes an axle 32a, wheels 34a and a rear bracket 36a which is rigidly connected to the axle 32a and an upward right pivoting arm 38a which is rigidly connected to the axle 32. A support arm 40a may be provided between the arm 38a and the rear bracket 36a for support.

Left and right rake carrier brackets 42a and 44a are carried by the frame 30a, such as on frame extensions 31 and 33, respectively. The brackets 42a and 44a and the extensions 31 and 33 each include a rotatable pivot point on an axis 46a and 48a, respectively. The brackets 42a and 44a and the axis 46a and 48a are positioned transversely to the axle 32a. The carrier brackets 42a and 44a and pivot points on axis 46a and 48a are constructed to receive the main support arms 18a and 20a, respectively, of the fingerwheel hay rakes. Therefore, the brackets and arms are rotatable around the axis 46a and 48a, respectively.

The hitch assembly 54a is provided having a suitable connection 55a for attachment to a towing vehicle such as the tractor 12. The vehicle hitch assembly 54a is pivotally mounted at pivot points 56a to the main frame 30a and includes a cross bar 58a mounted at the rearward end of the hitch assembly 54a.

Power means, such as hydraulic piston and cylinder assemblies 60a, are pivotally connected between the arm 38a of the frame assembly 30a and one of the frame extensions 31 and 33, respectively. The power means 60a are controlled and actuated from the towing vehicle 12. Actuation of each of the power means 60a causes the frame extensions 31 and 33 to rotate around the axis 46a and 48a, respectively, to a position as best seen in FIG. 6. This causes the brackets 42 and 44 and the arms 18a and 20a, respectively, to rotate their connected wheel rakes inwardly.

A rotating mechanism is provided between the cross bar 58a of the hitch assembly 54a and the axis 46a and 48a of the frame 30a for rotating the frame 30a upwardly relative to the hitch assembly 54a as the hydraulic piston and cylinder assembly 60a are retracted. The rotating assembly may include connecting links 66a and 68a, respectively, which are connected between the cross bar 58a and L-shaped lever arm 70a and 72a, respectively which are turn connected to the axis 46a and 48a, respectively. Therefore, rotation of the axis 46a and 48a from FIG. 5 to FIG. 6 causes rotation of the L-shaped lever arms 70a and 72a, respectively, and thus downward movement of the connecting links 66a and 68a thereby causing the rear end of the frame to be raised relative to the cross bar 58a of the hitch assembly 54a. Thus, at the same time that the finger rakes are therefore being moved inwardly by the inward rotation of the frame extensions 31 and 33, the rear end of the frame 30a is being raised to move the finger rakes upwardly from the raking position to the transport position.

The present invention, therefore, is well adapted to carry out the objects and attain the ends and advantages mentioned as well as others inherent therein. While a presently preferred embodiment of the invention has been given for the purpose of disclosure, numerous changes in the details of construction, and arrangement of parts, will be readily apparent to those skilled in the art and which are encompassed within the spirit of the invention and the scope of the appended claims.

What is claimed is:

1. A hay rake movable between a rake position and a transport position comprising,
   a frame assembly supported by an axle and wheels for being moved by a vehicle,
   a plurality of fingerhweel rakes, each of which is rotatably carried by the frame on a rotatable pivot forming an axis which is positioned transversely to the axle,
   a hitch assembly pivotally connected to the frame and including means for connection to the vehicle,
   a connecting linkage connected between the hitch assembly and the frame, and
   a power means for rotating the rakes about the axis and for rotating the rakes vertically by rotational movement of the frame assembly relative to the hitch assembly.

2. A hay rake movable between a rake position and a transport position comprising,
   a frame assembly supported by an axle and wheels for being moved by a vehicle,
   a plurality of fingerwheel rakes, each of which is rotatably carried by the frame on a rotatable pivot forming an axis which is positioned transversely to the axle,
   a hitch assembly pivotally connected to the frame and including means for connection to the vehicle,
   a connecting linkage connected between the hitch assembly and the frame, and
   power means connected to the frame for rotating the wheel rakes about their axis and rotating the frame relative to the hitch assembly thereby rotating the rakes between a downward and outward rake position and an upward and inward transport position.

3. A hay rake movable between a rake position and a transport position comprising,
   a frame assembly supported by an axle and wheels for being moved by a vehicle,
   left and right rake carrier brackets carried by the frame, each said bracket including a rotatable pivot forming an axis, and said brackets and axis positioned transversely to the axle,
   a wheel rake pedestal rotatably connected to each bracket about said axis,
   a fingerwheel rake assembly supported from each pedestal,
   a vehicle hitch assembly pivotally connected to the frame and including means for connection to a vehicle,
   power means connected between the frame and said brackets for rotating the wheel rake pedestals about their axis, and
   a connecting linkage connected between the hitch assembly and the frame whereby actuation of the power means causes rotation of the frame relative to the hitch assembly for rotating the pedestals relative to the hitch assembly.

4. The apparatus of claim 1 wherein the power means is a hydraulic piston and cylinder assembly controlled from the towing vehicle.

5. The apparatus of claim 1 wherein the hitch assembly includes a side brace pivotly connected to opposite sides of the frame assembly and said hitch assembly pivot connection to the frame is between and in line with the pivot connection of said side braces to the frame assembly.

6. The apparatus of claim 1 wherein the connecting linkage include a ball and socket connection between the hitch assembly and include lever arms for accommodating movement of the frame assembly relative to the hitch assembly.

7. The apparatus of claim 1 wherein each fingerwheel rake includes a main arm supporting a plurality of wheel hay rakes in which the main arm is at an angle to the axis when the rake is in the rake position.

8. The apparatus of claim 1 wherein the hitch assembly includes a cross-bar positioned spaced from the pivot connection of the hitch assembly to the frame, and said cross-bar extends parallel to the axle to adjacent each of the rotatable pivots.

9. A hay rake movable between a rake position and a transport position comprising,
   a frame assembly supported by an axle and wheels for being moved by a vehicle,
   a plurality of fingerwheel rakes, each of which is rotatably carried by the frame on a rotatable pivot forming an axis which is positioned transversely to the axle,
   a hitch assembly pivotly connected to the frame and including means for connection to the vehicle,
   power means connected between the hitch assembly and the frame for rotating the rakes about the axis and relative to the hitch assembly, and
   a rotating mechanism connected between the hitch assembly and the rakes for rotating the rakes about the axis as the frame is moved relative to the hitch assembly for moving the rakes between a rake position and a transport position.

10. A hay rake movable between a rake position and a transport position comprising,
   a frame assembly supported by an axle and wheels for being moved by a vehicle,
   left and right rake carrier brackets carried by the frame, each said brackets including a rotatable pivot forming an axis, and said brackets and axis positioned transversely to the axle,
   a wheel rake pedestal rotatably connected to each rake carrier bracket about said rotatable pivot,
   a fingerwheel rake assembly supported from each pedestal,
   a vehicle hitch assembly pivotly connected to the frame and including means for connection to a vehicle,
   power means connected between the hitch assembly and the frame for rotating the frame relative to the hitch assembly,
   a lever arm connected to each of the pedestals, and
   a connecting link connected between the hitch assembly and each of the lever arms whereby actuation of the power means causes rotation between the frame and the hitch assembly thereby causing said lever arms to rotate the wheel rake pedestals about said axis between the rake position and the transport position.

11. The hay rake of claim 1 wherein the hay rake includes a front and a back and the connecting linkage is aft of the hitch assembly pivot connection to the frame.

12. The hay rate of claim 1 wherein the hitch assembly pivots vertically relative to the frame.

* * * * *